United States Patent [19]
Clinton, III et al.

[11] Patent Number: 5,520,329
[45] Date of Patent: May 28, 1996

[54] METHOD AND APPARATUS FOR COMPENSATING FOR ENVIRONMENTAL EFFECT

[75] Inventors: Russell M. Clinton, III, Humble; William P. Jones, Baytown; Mark A. Roffman, Crosby, all of Tex.

[73] Assignee: Chevron Research and Technology Company, a Division of Chevron U.S.A. Inc., San Francisco, Calif.

[21] Appl. No.: 221,812

[22] Filed: Apr. 1, 1994

[51] Int. Cl.⁶ ............................................. G01K 3/00
[52] U.S. Cl. ............................ 236/68 C; 374/109
[58] Field of Search ..................... 236/68 C, 68 R, 236/91 C, 91 G, 91 A; 374/109, 29

[56] References Cited

U.S. PATENT DOCUMENTS 2,826,072  3/1958  Kliever .................................. 374/109
4,504,157  3/1985  Crabtree et al. ....................... 374/109
5,102,230  4/1992  Kobayashi et al. .................... 374/109

*Primary Examiner*—William E. Wayner
*Attorney, Agent, or Firm*—M. W. Carson

[57] ABSTRACT

A method and apparatus for measuring and compensating for the impact of environmental effects on industrial processing units. A thermal test element having a low thermal mass and high conductivity is exposed to the environment. Ambient air temperature is sensed at a nearby location, and a differential temperature controller determines how much energy is required to maintain the test element at a desired temperature differential from ambient temperature. Duty cycle and wattage outputs enable feedforward compensation for environmentally induced process unit control disturbances.

34 Claims, 8 Drawing Sheets

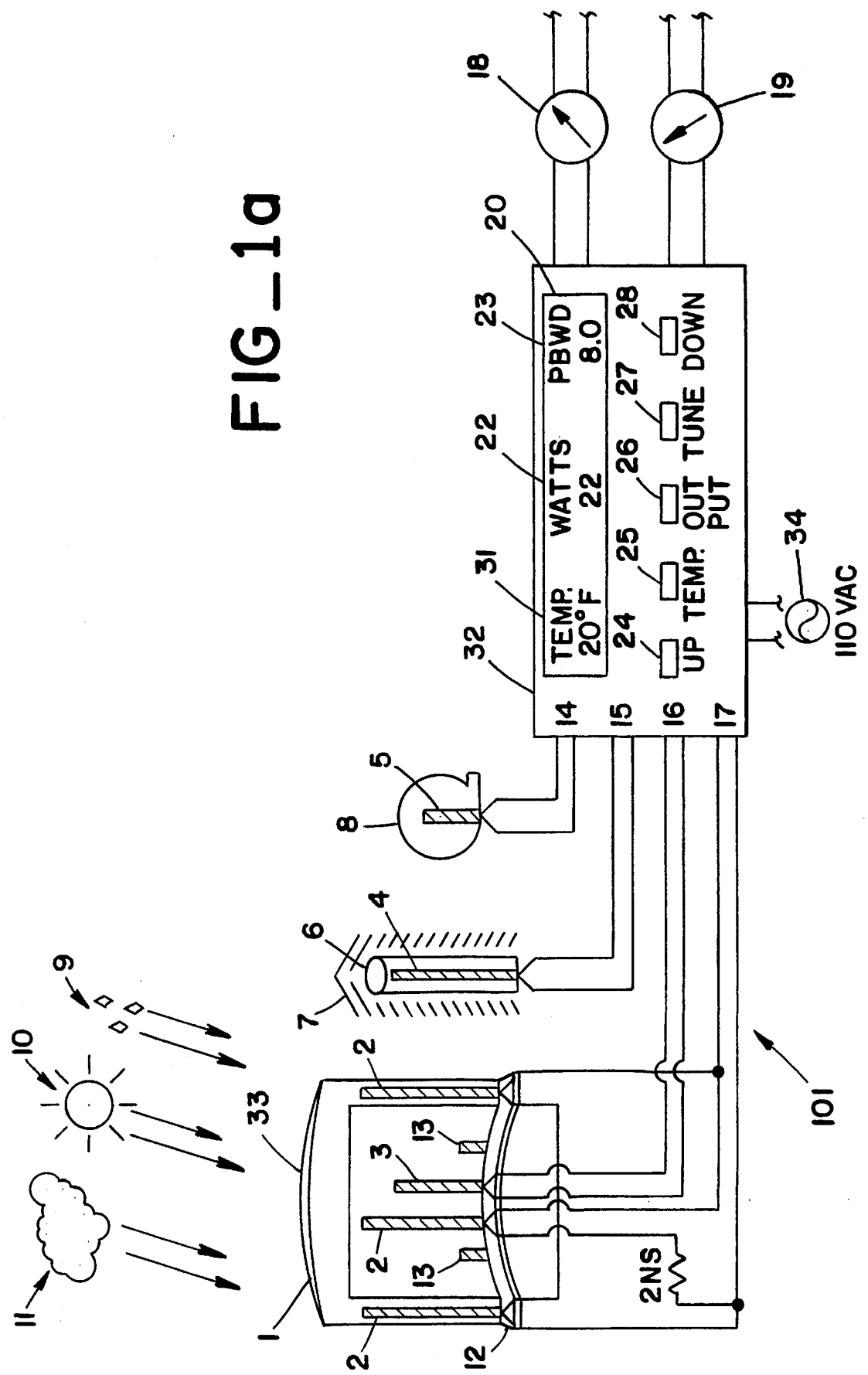

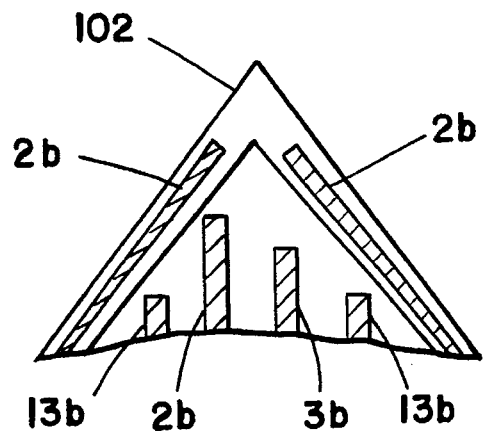
FIG_1b
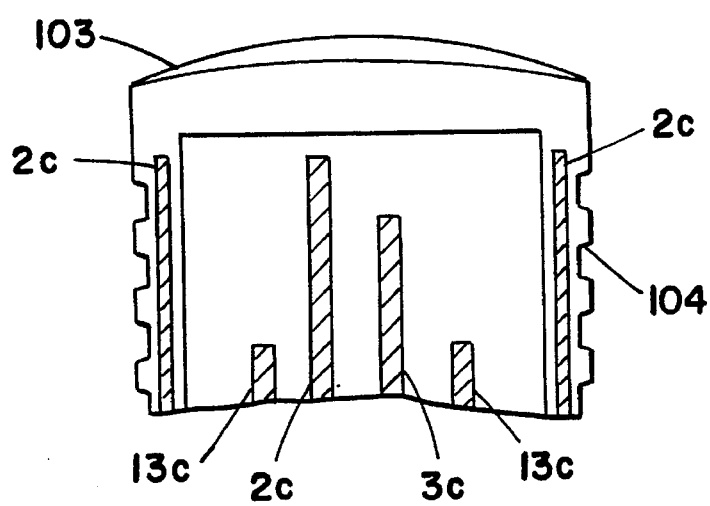
FIG_1c
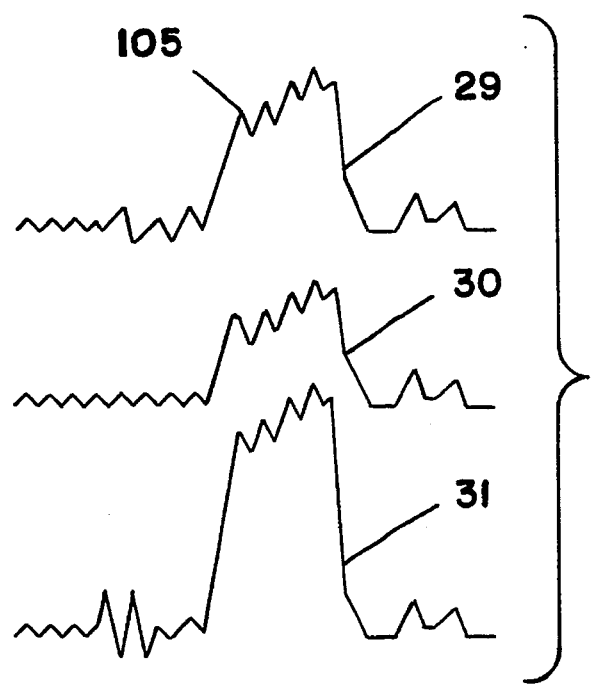
FIG_1d

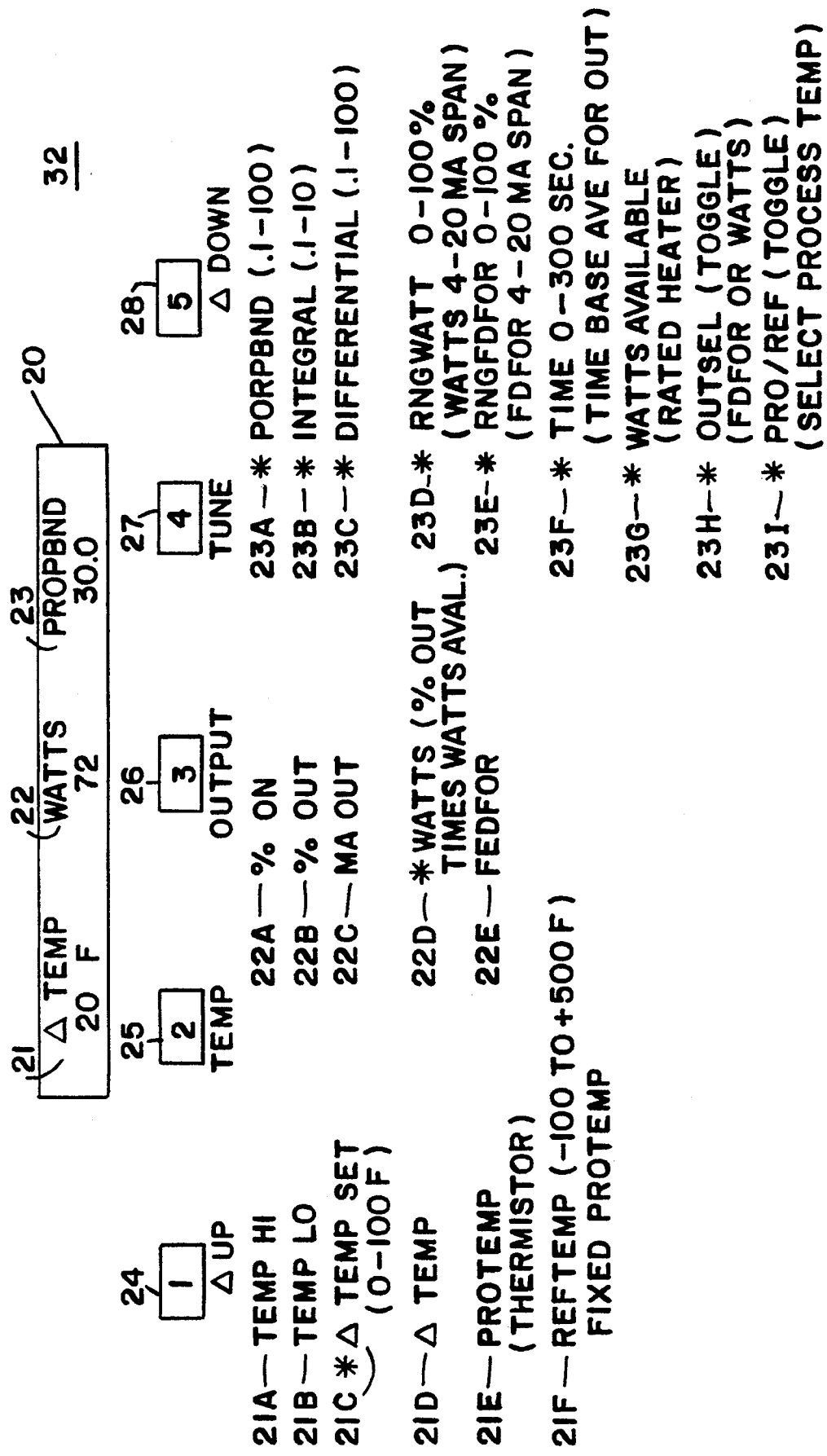
FIG_2

FEED FORWARD OUTPUT CALCULATION

FEED FORWARD = DUTY CYCLE * (PROCESS TEMP. − AMBIENT TEMP.) * FACTOR
VARIABLE      % ON         PROTEMP OR REFTEMP   TEMP LO       RNGFDFOR (Vff)         (HDC)        (Tp)                 (Ta)          (Rf)

22E / 22A / 21E OR 21F / 21B / 23E

FIG_3

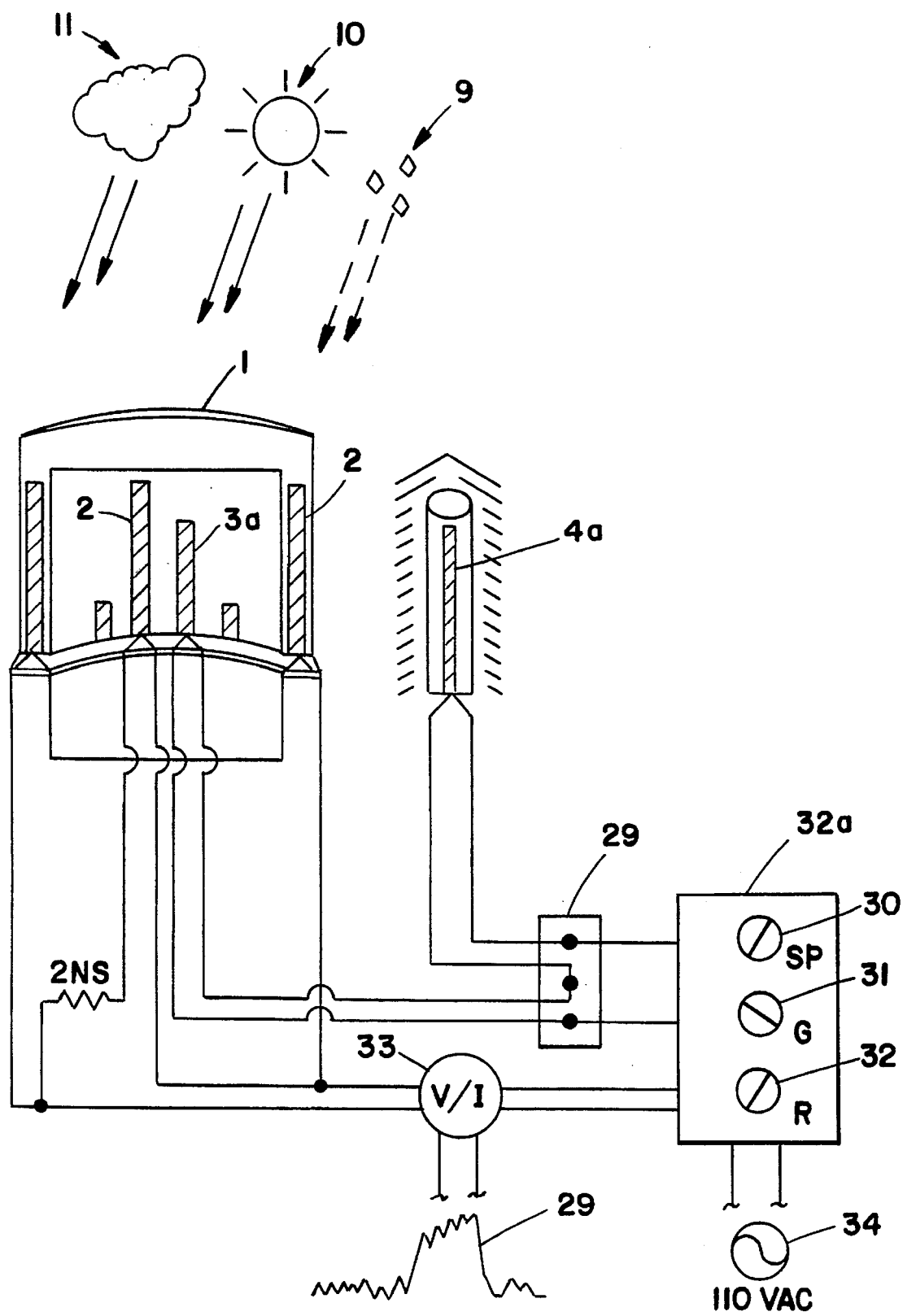
FIG_4

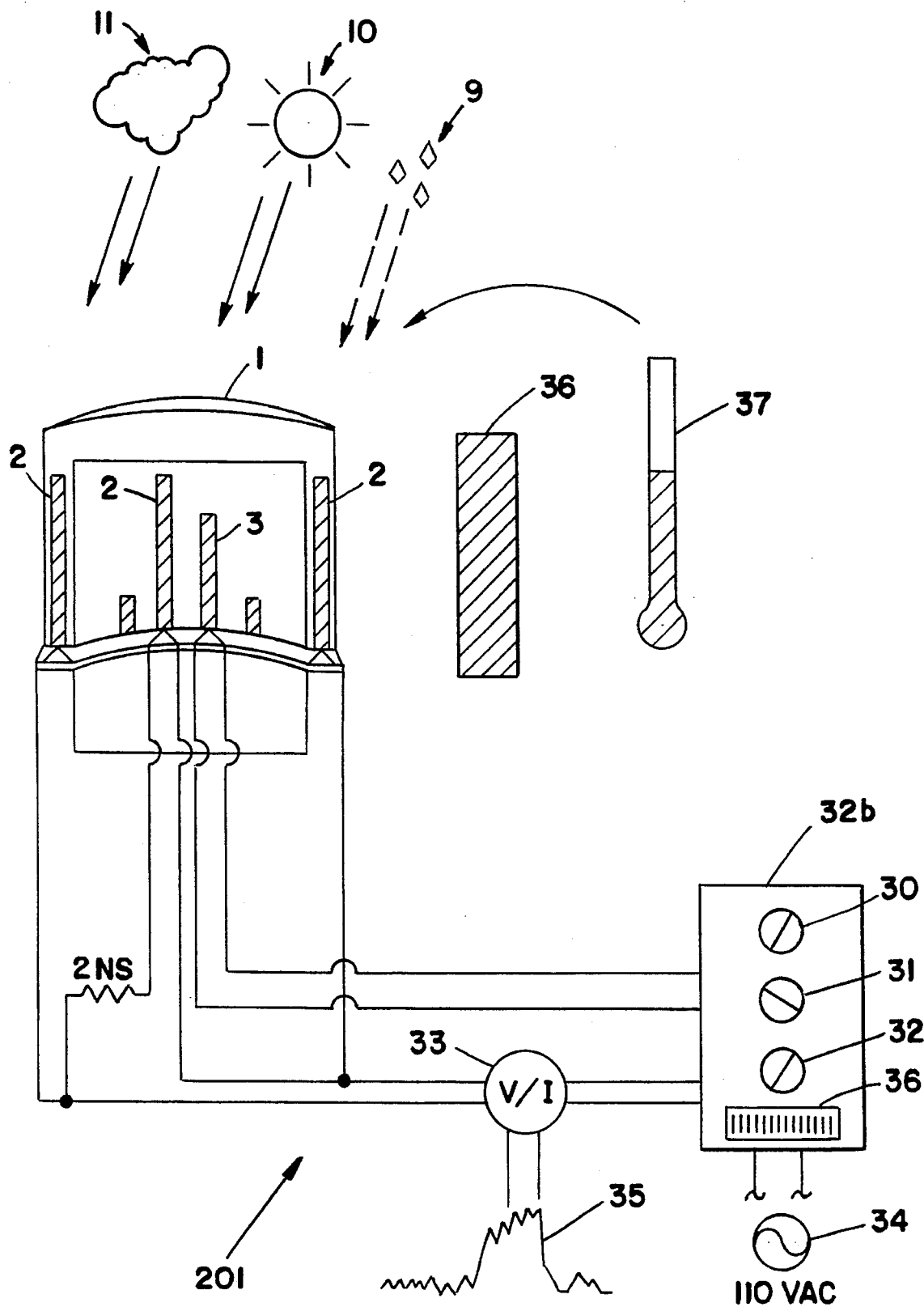
FIG_5

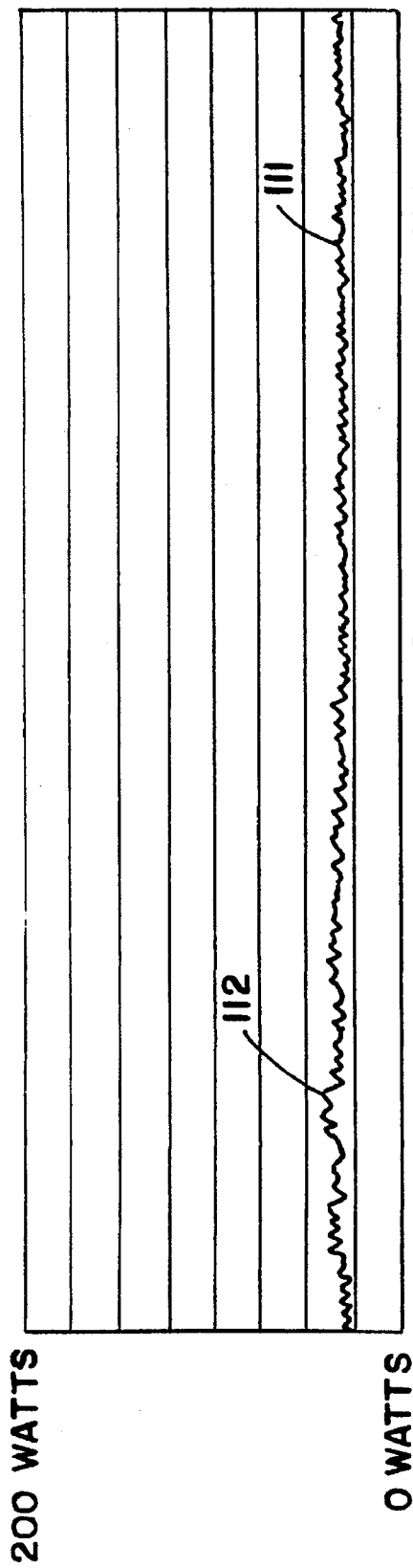
FIG._6
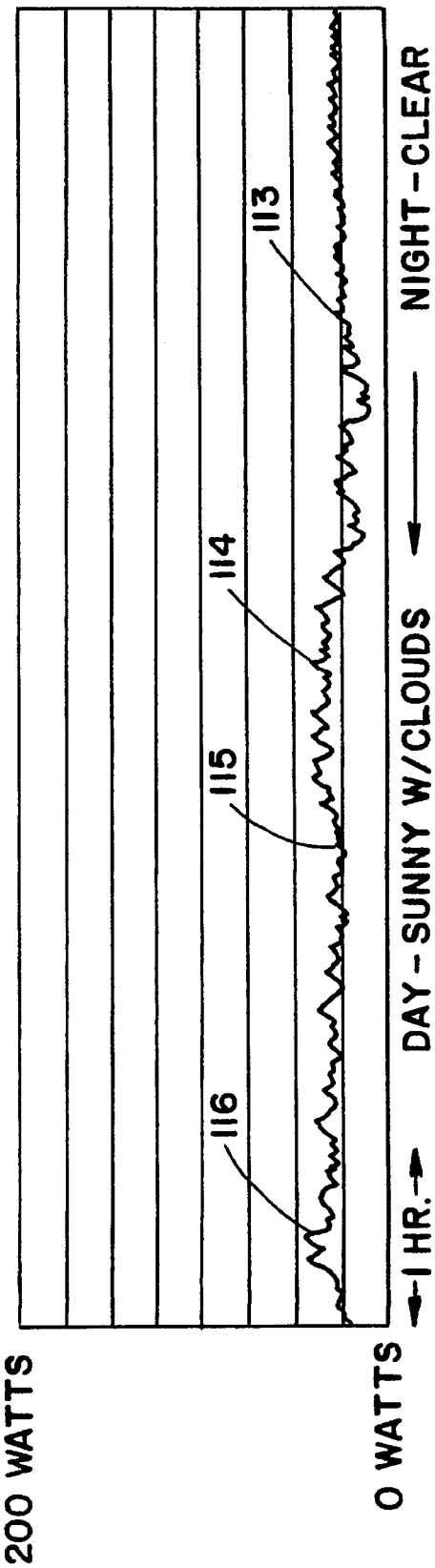
FIG._7

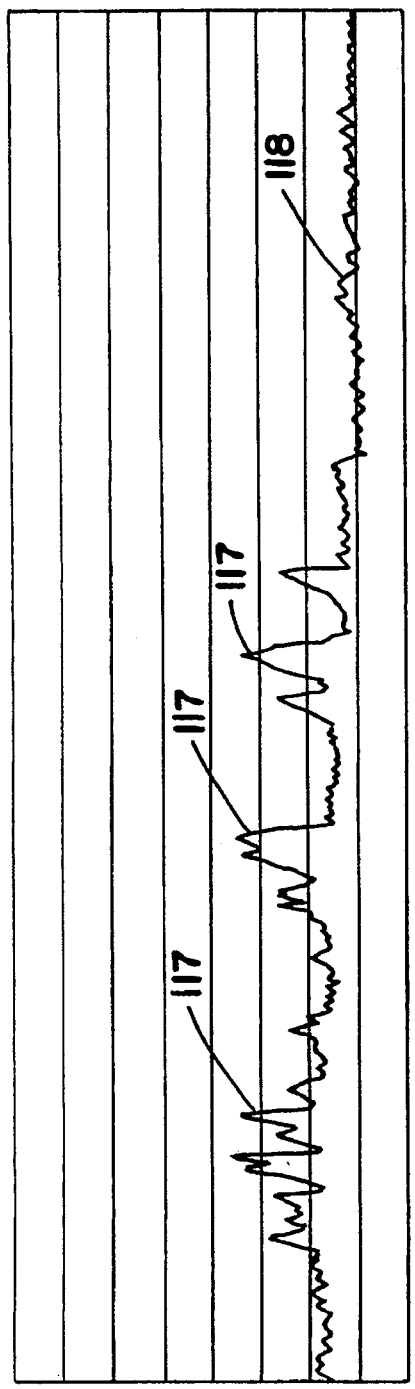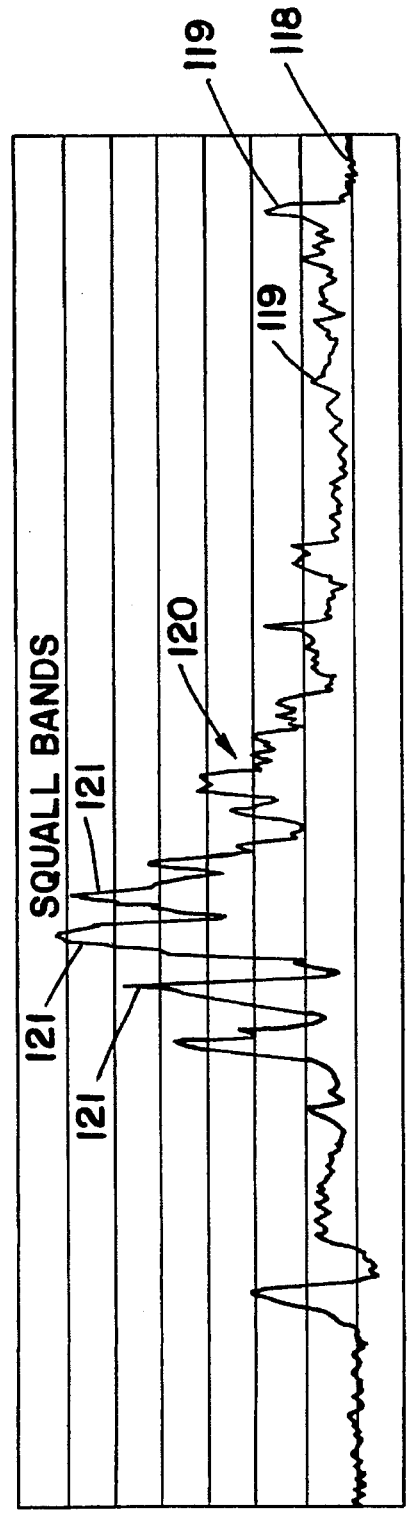

METHOD AND APPARATUS FOR COMPENSATING FOR ENVIRONMENTAL EFFECT

FIELD OF THE INVENTION

The present invention relates generally to operating processes in the chemical, petrochemical, and allied industries. More specifically, this invention provides a method and apparatus for determining the effects of and compensating for, various environmental conditions that impact these operating processes. It is particularly useful for feedforward compensation for the effects of wind, rain, and sunlight.

BACKGROUND OF THE INVENTION

One of the problems that plagues advanced control strategies and attempts to maintain stable process operating temperatures in various operating processes in the chemical, petrochemical, and allied industries is the inability to cope with severe environmental changes (i.e., rain storms). Existing feedforward methods and multi-variable control technologies attempt to compensate for all of the process disturbances (i.e., feedstock changes, mass flow changes, etc.) and are effective in coping with these demands. Feedforward methods are defined as the anticipation of a required action to prevent an error or a condition from causing an undesired effect. These controllers may include ambient temperature as a disturbance feedforward variable, however ambient temperature alone does not reflect the full environmental thermal impact on operating processes. Ambient temperature is defined as the free air temperature unaffected by conditions such as sunlight, wind, or precipitation.

The large change in heat flux (defined herein as the amount of calories that are input or output to/from a process unit over a period of time) due to rain storms and/or other factors such as wind or radiation, acts to blindside process controllers since no disturbance variables are included in their cascade (control) strategy or in the multi-variable controller matrix. Many operating processes in the chemical, petrochemical, and allied industries currently experience pronounced undesirable effects on fractionators, reactors etc. from these types of environmental impacts.

The prior art does not address such environmental thermal impact on operating processes. U.S. Pat. Nos. 4,030,986, 4,620,284, 5,260,865, 4,616,325, 4,630,221, 4,672,842, 4,821,524, 5,150,690, and 5,139,548 all fail to even recognize the need to compensate for such environmental affects.

In order to provide feedforward control techniques to compensate for these types of environmental impact, Applicants hereby disclose the use of contemporary meteorological indicators (i.e., ambient temperature, rate of rain fall, radiometry input, wind speed, etc.) to compensate for ambient environmental process loading. While these indicators are beneficial as process feedforward inputs, their relationship is not straight forward and several pieces of instrumentation and complex mathematical solutions are required to fully compensate for these multiple environmental effects.

The prior art does not teach any means for evaluating the effects of such environmental factors on such industrial operating processes in a manner that could be used for feedforward controlling techniques.

It is therefor desirable to provide a simple, accurate, and economical feedforward compensation measurement method and apparatus that are directly related to the environmental BTU loading of these combined environmental effects. Applicants have developed an instrument and procedure which measures the combined effect of these variables directly. An accurate measurement is obtained by maintaining a physical test element at an arbitrary fixed temperature differential from ambient temperature, by means of a differential temperature controller, wherein the power (watts) required to maintain this differential temperature is representative of the BTU loading as a result of the aforementioned environmental conditions. In the preferred embodiment, a single apparatus can effectively provide feedforward compensation to several processing units.

SUMMARY OF THE INVENTION

A method and apparatus for measuring and compensating for the impact of environmental effects such as wind, rain, and sunlight, on at least one industrial processing unit is provided. The apparatus comprises a thermal test element that is exposed to the environment. In one embodiment, the test element has a low thermal mass that maximizes temperature stability and control, and is comprised of a material having high conductivity. An ambient temperature sensing element having a thermal mass relationship similar to the test element is disposed in close proximity to the test element, but is exposed only to ambient air temperature, via a housing.

The temperatures of the test element and the ambient sensor are determined, and a differential temperature controller means determines how much energy is required to maintain the test element at a desired, fixed differential temperature from ambient temperature. Duty cycle and wattage outputs are parameters of environmental loading. In one embodiment of the invention, heating elements maintain the test element at the desired differential fixed temperature.

In another embodiment of the invention, a feedforward compensation means is enacted to compensate a selected process unit for the effects of environmentally induced disturbances, by maintaining the test element at the selected process's actual temperature rather than a differential temperature.

DESCRIPTION OF THE FIGURES

FIG. 1a is a schematic sectional diagram of the apparatus used in one embodiment of the invention illustrating the test element and instrumentation.

FIGS. 1b and 1c are schematic sectional views of two alternative designs for the test element.

FIG. 1d shows response traces of the apparatus during a rainfall.

FIG. 2 is a schematic diagram illustrating the functionality of one embodiment of the differential temperature controller means, including example process inputs, wattage, and feedforward compensated process outputs.

FIG. 3 illustrates an example calculation embodied for determining relationships between the environmental loading wattages and process element feedforwards.

FIG. 4 is a schematic, sectional diagram of one embodiment of the invention, using a simplified differential temperature controller based on opposed thermocouples.

FIG. 5 is a schematic, sectional diagram of an additional embodiment of the invention wherein the test element is maintained at a given process unit element temperature.

FIG. 6 shows a chart of the output response of the inventive apparatus during a calm night and an overcast day.

FIG. 7 shows a chart of the output response of the inventive apparatus during clear calm night and into a partially sunny day.

FIG. 8 shows a chart of the output response of the inventive apparatus during multiple periods of light rainfall.

FIG. 9 shows a chart of the output response during a period of light rainfall during thunderstorm activity, which progressed into periods of very heavy rainfall.

DETAILED DESCRIPTION OF THE INVENTION

The present invention provides a method and apparatus for estimating and compensating for ambient weather conditions, aside from temperature, that affect process control units in various industries. With reference to the drawings, FIG. 1a is a sectional, schematic diagram of one embodiment of the invention (101), illustrating test element (1) and the associated electrical connections. A thermal test element (1) is preferably designed to have a high surface area, a high conductivity, and a low thermal mass. Metallic compounds, such as aluminum, copper, brass, and silver are especially effective. A test element (1) having a slightly domed top (33) to prevent standing water is desirable.

The test element is exposed to the environment and is maintained at an elevated temperature via at least one corresponding heater (2) (2NS, representing a multiple heater not shown in cross section), by the output of a differential temperature controller means (32) of a type known in the art. The differential temperature controller means (32) senses the temperature of the test element (1) via thermistor (3), determines how much energy is required to maintain the test element (1) at an arbitrary, temperature which is selected to be at a controlled differential above ambient temperature, by comparison to the ambient thermistor (4) which is disposed in free air.

The ambient thermistor (4) senses the ambient temperature and is preferably installed in a block (6) preferably having a similar thermal time constant to the test element (1) and is in close proximity to the test element, such that varying ambient temperature changes effect both the test element (1) and block (6) at nearly the same rate. It is desirable that the thermal mass relationship (mass/area) between the test element and the ambient temperature sensing element is made to be nearly equal, to provide nearly identical time constants, with a change in ambient temperature. Applicants have determined that a differential temperature controller accuracy of within $1/10$ of a degree F. between the test element (1) and block (6) is attainable and this level is acceptable, although it is desirable to be as accurate as possible.

In the preferred embodiment, the ambient thermistor (4) is housed in a ventilated enclosure (7) such that it senses the free air temperature and is not adversely affected by environmental effects such as radiation, wind, or rainfall impingement. The measured test element temperature (16) and measured ambient temperature (15) are compared and controlled to a given temperature differential setpoint (21) (between the two) by the differential temperature controller means (32) (for example 20 degrees F.) such that the controller means output (17) represents the line voltage (34), which is switched on and off using, for example, a fully proportional, zero cross over temperature controller algorithm of a type known in the art, to maintain the test element at this arbitrary temperature setpoint (for example, 20 degree F.) above ambient temperature. It is desired that the differential temperature controller provides an optimized thermal response and an optimized stability, and that the test element has a minimum thermal mass to maximize such stability and control.

The test element heaters (2) and (2ns) in the preferred embodiment are electrically connected such that they are in series parallel, as shown in FIG. 1a, thereby reducing their actual wattage to $1/4$ of the stated wattage (as they are operating in series at $1/2$ the applied voltage). It is desirable to use as many heaters as is practical, having the lowest wattage as possible. This provides for a low watts/surface unit area and relatively uniform heat distribution. The test element thermistor (3) is also preferably located in close proximity to ($1/2$" for example) one of the heaters (2), thus providing good thermal feedback response, and allowing the test element (1) to be controlled to within $1/10$ of a degree F.

Any disturbance to the surface heat loss of the test element (1) (i.e., rainfall (9) ambient radiation (10), and/or changes in wind cooling (11)) will cause a nearly instantaneous change of the temperature (16) of the test element (1), which by comparison to the ambient reference temperature (4) will cause a deviation from the desired setpoint in the differential temperature controller means (32).

The controller algorithm in the differential temperature controller (32) will, as a result of this deviation, either increase or decrease the output duty cycle (17) to the heaters (2), thus restoring the test element (1) to its desired preset temperature differential (21) (for example, 20 degrees F.) from ambient. The controller output duty cycle is the percent of time that the heater is on, compared with the time that it is off and represents the energy required to maintain the test element at the desired temperature differential, and provides the physical measurement of the sum loss of heat to the environment.

The environmental loading data, coupled with the process differential temperature from ambient, is used to calculate feedforwards and is cascaded by classical means known in the art to enact a feedforward compensation for environmentally induced process control disturbances to at least one selected industrial processing unit using process deadtimes and lead/lag algorithms that are known in the art, or may be directly factored in as a disturbance variable to multivariable controllers using relationship known in the process control art.

Alternate embodiments of the test element (1) are shown in FIGS. 1b and 1c. The test element may be selectively engineered, by varying its shape and dimensions, to provide varying sensitivity to different environmental conditions, (i.e., test element (102) having a cone shape provides a higher surface area loading for rain impingement and less surface area for radiation and wind). In another embodiment, test element (103) has fins (104) to provide a higher response to wind loading than does the cylindrical test element (1). Heaters, thermistors, and other components are noted as "b" & "c" functions of those in FIG. 1a on both of these alternate test element designs (FIGS. 1b and 1c).

In the preferred embodiment, located in the test element (1) are mounting means such as holes (13) drilled and tapped into the bottom of the test element (1), and a thermal insulating gasket (12) on which the test element (1) is mounted to a surface exposed to the environment. The differential temperature controller means (32), in its simplest embodiment, provides for maintaining the temperature differential between the test element and ambient by activating at least one heater (2) to maintain this temperature at a given differential setpoint and also providing an integration of the heater voltage/cycle time, to provide the power value (or watts) (22) and to output this value (18) in a desired format (for example, a 4–20 ma scale) for process control. This can be done, for example, by taking the duty cycle and applying a time base to the "on" and "off" times to obtain an average.

In the preferred embodiment of the invention, as shown in FIG. 1a, additional functionality is provided. The invention can also display (20) and/or adjust, the temperature variables (21), the variable output (22), and the controller tuning (23), by using, for example, up/down increment function buttons (24) and (28), temperature step functions (25), output step functions (26) and tuning step functions (27). Such display may be by means well known in the art such as digitally or on a strip chart recorder.

The temperature of a selected process unit element to be compensated (8) can also be input to the apparatus 101 via an additional thermistor (5). This input may be related mathematically to the environmental loading wattage such that the feedforward control variable for the processes unit element (8) may also be an output (19). In one embodiment of the invention, a time constant filtering is applied to the wattage output to reduce oscillations.

An example of a typical strip charge recorder trace output for a rainfall impinging on the test element (1) is shown in FIG. 1d at (29) depicting a situation where a stable low environmental loading wattage increases substantially (105) due to the thermal impact of the rainfall on the test element (1) as recorded via the wattage output (18). An example of additional data is shown based on the feedforward output (19) for two process units that are both based on the same input signal (18), one that is relatively close to ambient temperature (30) and a second (applied by a higher gain factor) where the process deviates substantially from ambient (31).

In another embodiment of the invention the apparatus can (a) estimate the impact of changing environmental conditions, (b) measure the effect of changing environmental conditions and their relationship to operating unit processes, (c) provide a control variable that may be used to compensate for environmental variations and their resultant loading of such processes, (d) provide a feedforward controller that compensates for environmental changes and prevent related process upsets, and (e) provide control strategies to incorporate process environmental loading data into cascade and multi-variable control systems for realtime compensation of operating processes.

In still another embodiment of the invention, the inventive apparatus compensates for the impact of environmental effects on a specific processing unit. In this embodiment, the apparatus (201) in FIG. 5 comprises a thermal test element that is exposed to the environment, a means for sensing and controlling the test element temperature, and a means for determining how much energy is required to maintain the test element at a desired fixed temperature to the same value as the specific elevated process unit temperature, where such environmental effects measured will include the loading due to ambient temperature as well as from rainfall, wind, and radiation.

FIG. 2 shows an example configuration of display and setpoint functions disposed on a custom programmed, differential temperature controller means (32) derived from commercially available components, that is used in one embodiment of the invention. A display such as liquid crystal display (20) has three basic functions shown: Temperature (21), Output (22), and Tuning (23). Each of these functions has multiple variables that may be stepped through by activating their respective response means, such as buttons (25), (26), and (27) respectfully. For example, if the "Temperature" function is activated, the following may be displayed: the test element (or High) temperature (21a), the ambient (or Low) temperature (21b), the Differential Temperature Setpoint (21c) may be displayed and adjusted up or down using the function buttons (24) Up, and (28) Down, the actual temperature differential (Delta Temperature) (21d), the Process Element Temperature (21e), and a Fixed Reference Temperature (21f) (a fixed value substitute for the process element temperature).

The "Output" (26) variables include (in this example): the % Heater Duty On Time (22a), the % Output (22b) (which is rangeable using tuning variable "Range" (23d)), the current loop output (for example, 4–20 ma) (22c) which is based on the % Output (22b), the Watts powering the heater (22d) (based on the % Duty On cycle (22a) times the Rated Heater Watts available (23g). The Ranged Feedforward Output for a specific process element is also available (22e) (based on the % On (22a) as calculated in the feedforward output relationship stated in FIG. 3 and applied against the Range Factor (23e).

In the "Tuning function" (27) the Proportional Band (gain) (23a), Integral action (reset) (23b), and Differential action (rate) (23c) of the differential temperature controller means (32) may be tuned using up control (24) and down control (28) to obtain the optimum test element temperature control. The tuning function thus enables a user to adjust gain, reset and rate to select an optimum reaction time and to control oscillation. It is preferable for the temperature controller means (32) to react as quickly as possible. Ranging factors for Watts (23d) and Feedforward calculated process response (23e) are also provided. A time based Average (23f) is provided to smooth the % On signal. Watts Available (23g) is used in calculating displayed wattage from % On. (The % On (Duty Cycle) times the Watts available), equals the heater wattage that is applied to the test element (1). An Output Select toggle (23h) is provided to switch the current loop output (typically 4–20 ma) from Watts to Calculated Feedforward, and a Process Temperature versus Reference Temperature toggle (23i) is also provided for selecting the fixed process temperature value versus realtime process element input temperature.

FIG. 3 illustrates the mathematical relationship used for the calculation of the feedforward variable, Vff (22e), which equals the heater duty cycle, HDC, (22a) times the quantity (process temperature, Tp, (either (21e) or (21f) as determined by the toggle (23i)) minus the ambient temperature, Ta, (21b), times an optional range factor (23e) for optimal scaling.

Another embodiment of the invention is shown in FIG. (4) wherein the temperature sensing thermistors for ambient (4a) and for the test element (3a) are replaced with two thermocouples which are series opposed at isothermal junction (29) providing an opposed millivolt differential temperature input to temperature controller (32a) having a millivolt setpoint (30), adjustable gain (31) and reset (32). The heaters (2) are now powered via this proportional temperature controller from a voltage feed (for example a 110 volt AC feed) (34) through a scaleable voltage/current integrating device (33) known in the art that provides the wattage output trend (29), which is representative of the thermal loading on the test element (1).

An additional embodiment of the invention is shown in FIG. 5. Here, the test element (1) is maintained at the actual temperature of a given specific process unit element by a temperature controller means (32B), and the wattage required to maintain this temperature is measured. The test element (1) is maintained at the actual desired process element temperature by thermistor (3) and temperature controller (32B) rather than at a differential temperature from ambient, thereby simplifying the calculations, (including ambient temperature as a disturbance) and reducing non-linear errors, for a single given process unit element. This embodiment would be appropriate for a given single process unit element running at an elevated temperature that is identical to the test element (1) temperature as controlled by temperature controller (32B) and indicated on the temperature indicator (36) by the setpoint (30) and gain function (31) and reset function (32). The heater duty would again be integrated by watt meter (33) having an output (35) indicating the watts required to maintain the test element at the process unit element temperature.

Response trace (35) in this example is indicative of the wattage that embodies the thermal effects of rain, wind, and radiation, however it also embodies the ambient/process temperature difference (37) as an additional parameter and as such is proportional to the true wattage that is required to maintain the process unit at an elevated (or reduced) temperature.

In all embodiments of the invention an additional tuning parameter may be incorporated by the addition of nominal insulation (36) to the test element to simulate the time constant of the process. Any type of insulating material could be used. Fiberglass and styrofoam are especially effective. The lead/lag times could, therefore, be calculated mathematically or could be established using an optimal configuration of insulating material.

The invention thus provides a simple, economical process measurement that may be used as a first principle feedforward environmental load compensator.

EXAMPLE

The inventive method and apparatus have been field tested at Applicant's Cedar Bayou, Tex. facility. A differential temperature controller (32) was wired to an aluminum test element (1) having a hollow cupped shape and approximately 6" in diameter and 6" high with four cartridge heaters embedded symmetrically in the perimeter, two heaters each wired in series such that ¼ of their wattage output resulted in the net 200 watts for the four 200 watt rated heaters. The test element (1) was maintained at 20 degrees F. above the ambient free air reference (6) by the differential temperature controller (32).

The ambient reference temperature sensing element (4) was also embedded in a ¾" aluminum stock to provide a similar time constant for ambient temperature changes as the test element. A housing (7) was designed from polyethylene piping to assure that the reference sensing element provided the free air temperature and was not affected by wind, rainfall, or radiation. The test element design made it possible to sufficiently tune the instrument to provide exceptional response to thermal loading effects such as rainfall, radiation, and wind.

Initial field testing was completed one day prior to the beginning of Applicant's ethylene process unit test run, thus allowing the data to be incorporated in the fractionation control matrix.

FIG. 6 shows the output of the apparatus (101) during a relatively calm, clear night (111) and an overcast day (112) with a stable 25 to 26 watts heater input required to maintain the test element at the 20 degree differential. An ambient temperature range of greater than 30 degrees F. was experienced for this period with little or no effect on the instrument output.

FIG. 7 shows the response of the apparatus during a progression from a clear night (113) dead calm into a partially sunny day (114) where the wattage dropped to less than 5 watts input (115) during period of bright sunlight impingement and moved back up to the stable 25 to 30 watts (116) during overcast periods.

FIG. 8 shows the response of the apparatus (101) during an overcast day (118) moving into multiple periods of light rainfall when the wattage loading approached 100 during the heaviest rainfall periods (117).

FIG. 9 shows the response of the apparatus during a period when light rainfall during thunderstorm (119) activity progressed into very heavy rainfall (120) that resulted in 180 watts of loading on the test element. Differentiation of the actual squall bands in the heaviest part of the rainfall can be seen at (121).

As indicated in these trend recordings, the inventive device performed extremely well, with the response and stability required to indicate true environmental thermal loading showing the effects of radiation, winds, and rainfall impingement on the test element.

While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

What is claimed is:

1. An apparatus for measuring the impact of environmental effects on at least one processing unit comprising:
   (a) a thermal test element that is exposed to said environmental effects;
   (b) means for sensing the temperature of said test element and the ambient temperature;
   (c) a housing that permits an accurate determination of said ambient temperature;
   (d) means for determining how much energy is required to maintain said test element at a desired controlled differential temperature from the ambient temperature of a location in close proximity to said test element; and
   (e) means for maintaining the test element at said controlled differential temperature.

2. An apparatus for measuring the impact of environmental effects on at least one processing unit comprising:
   (a) a thermal test element that is exposed to said environmental effects;
   (b) an ambient temperature sensing element that is at a location in close proximity to said test element but is not exposed to said environmental effects and is instead exposed to the ambient air temperature;
   (c) means for sensing the temperature of said test element and the ambient temperature;
   (d) a housing that permits an accurate determination of said ambient temperature;
   (e) means for determining how much energy is required to maintain said test element at a desired controlled differential temperature from the ambient temperature of said ambient temperature sensing element; and
   (f) means for maintaining the test element at said controlled differential temperature.

3. An apparatus for compensating for the impact of environmental effects on at least one processing unit comprising:
   (a) a thermal test element that is exposed to said environmental effects;
   (b) an ambient temperature sensing element that is at a location in close proximity to said test element but is not exposed to said environmental effects and is instead exposed to the ambient air temperature;
   (c) means for sensing the temperature of said test element and the ambient temperature;
   (d) differential temperature controller means for determining how much energy is required to maintain said test element at a desired controlled differential temperature from the ambient temperature of said ambient temperature sensing element;
   (e) means for maintaining the test element at said controlled differential temperature;
   (f) a housing that permits an accurate determination of said ambient temperature sensing element; and
   (g) means to enact a feedforward compensation for environmentally induced process control disturbances to said processing units.

4. The apparatus of claim 3 wherein said feedforward compensation is dependent on a feedforward variable which is expressed as:

$$Vff = HDC*(Tp-Ta)*f$$

where
   Vff is the feedforward variable
   HDC is the thermal loading of the test element as indicated by the heater duty cycle
   Tp is the temperature of an individual processing unit
   Ta is the temperature of the ambient temperature sensing element, and
   f is a scaling factor.

5. The apparatus of claims 1, 2, or 3 wherein said means for maintaining said test element at said controlled differential temperature provides an optimized thermal response and optimal stability.

6. The apparatus of claim 3 wherein said differential temperature controller integrates a heater output current-to-voltage ratio such that duty cycle and wattage become a measured parameter indicative of environmental loading.

7. The apparatus of claim 6 wherein the wattage output required to maintain said elevated differential temperature can be output as a control variable.

8. The apparatus of claim 7 further comprising a means for applying time constant filtering to said wattage output to reduce oscillations.

9. The apparatus of claims 1, 2, or 3 wherein the thermal mass relationship (mass/area) between said test element and said ambient temperature sensing element is made to be nearly equal to provide nearly identical time constants with a change in ambient temperature.

10. The apparatus of claims 1, 2, or 3 wherein said test element is designed in a configuration to optimally respond to selected environmental effects such as rain, wind, and radiation.

11. The apparatus of claim 10 wherein said test element has a thermal mass to maximize temperature stability and control response.

12. The apparatus of claim 11 wherein said test element is insulated to provide a selected time constant that is compatible with the processing unit.

13. The apparatus of claim 12 wherein said test element is comprised of a metal having a high conductivity and a low thermal mass.

14. The apparatus of claim 13 wherein said test element is comprised of a metal selected from the group aluminum, brass, copper, and silver.

15. The apparatus of claims 1, 2, or 3 wherein said means for maintaining said test element at said second temperature is comprised of a plurality of heating elements.

16. The apparatus of claims 1, 2, or 3 wherein said differential temperature controller is further comprised of opposed differential thermocouples as the millivolt input setpoint.

17. An apparatus for compensating for the impact of environmental effects on a specific processing unit element comprising:
   (a) a thermal test element that is exposed to said environmental effects;
   (b) means for sensing the temperature of said test element and controlling said test element temperature to the same temperature as said processing unit element; and
   (c) means for determining how much energy is required to maintain said test element at a desired second fixed or variable temperature as an elevated process unit temperature where such environmental effects include the loading due to ambient temperature as well as from rainfall, wind, and radiation.

18. A method for measuring the impact of environmental effects on at least one processing unit comprising the steps of:
   (a) sensing the temperature of a thermal test element that is exposed to said environmental effects;
   (b) sensing the ambient temperature whereby a housing permits an accurate determination of said ambient temperature;
   (c) determining how much energy is required to maintain said test element at a desired controlled differential temperature from the ambient temperature of a location in close proximity to said test element; and
   (d) maintaining the test element at said controlled differential temperature.

19. A method for measuring the impact of environmental effects on at least one processing unit comprising the steps of:
   (a) sensing the temperature of a thermal test element that is exposed to said environmental effects;
   (b) sensing the ambient temperature at a location in close proximity to said test element, using an ambient temperature sensing element that is not exposed to said environmental effects and is instead exposed to the ambient air temperature and a housing that permits an accurate determination of said ambient temperature;
   (c) determining how much energy is required to maintain said test element at a desired controlled differential temperature from the ambient temperature of said ambient temperature sensing element; and
   (d) maintaining the test element at said controlled differential temperature.

20. A method apparatus for compensating for the impact of environmental effects on at least one processing unit comprising:
   (a) sensing the temperature of a thermal test element that is exposed to said environmental effects;
   (b) sensing the ambient temperature at a location in close proximity to said test element, using an ambient temperature sensing element that is not exposed to said environmental effects and is instead exposed to the ambient air temperature;

(c) determining how much energy is required to maintain said test element at a desired controlled differential temperature from the ambient temperature of said ambient temperature sensing element;

(d) maintaining the test element at said controlled differential temperature; and (e) calculating a feedforward compensation variable for environmentally induced process control disturbances to said processing units.

21. The method of claim 20 wherein said feedforward compensation is dependent on a feedforward variable which is expressed as:

$$Vff=HDC*(Tp-Ta)*f$$

where

Vff is the feedforward variable

HDC is the thermal loading of the test element as indicated by the heater duty cycle Tp is the temperature of an individual processing unit Ta is the temperature of the ambient temperature sensing element, and f is a scaling factor.

22. The method of claims 18, 19, or 20 wherein said test element is maintained at said controlled differential temperature to provide an optimized thermal response and optimal stability.

23. The method of claim 20 wherein said differential temperature controller integrates a heater output current-to-voltage ratio such that duty cycle and wattage become a measured parameter indicative of environmental loading.

24. The method of claim 23 wherein the wattage output required to maintain said elevated differential temperature can be output as a control variable.

25. The method of claim 24 further comprising the step of applying time constant filtering to said wattage output to reduce oscillations.

26. The method of claims 18, 19, or 20 wherein the thermal mass relationship (mass/area) between said test element and said ambient temperature sensing element is made to be nearly equal to provide nearly identical time constants with a change in ambient temperature.

27. The method of claims 18, 19, or 20 wherein said test element is designed in a configuration to optimally respond to selected environmental effects such as rain, wind, and radiation.

28. The method of claim 27 wherein said test element has a thermal mass to maximize temperature stability and control.

29. The method of claim 28 wherein said test element is insulated to provide a selected time constant that is compatible with the processing unit.

30. The method of claim 29 wherein said test element is comprised of a metal having a high conductivity and a low thermal mass.

31. The method of claim 30 wherein said test element is comprised of a metal selected from the group aluminum, brass, copper, and silver.

32. The method of claims 18, 19, or 20 wherein said test element is maintained at said second temperature by a plurality of heating elements.

33. The method of claims 18, 19, or 20 wherein said differential temperature controller is further comprised of bucked differential thermocouples as the millivolt input setpoint.

34. An method for compensating for the impact of environmental effects on a specific processing unit element comprising the steps of:

(a) sensing the temperature of a thermal test element that is exposed to said environmental effects;

(b) controlling said test element to the same fixed or variable temperature as the specific process unit element; and (c) determining how much energy is required to maintain said test element at a desired second fixed or variable temperature as an elevated process unit temperature, where said environmental effects include the loading due to ambient temperature as well as from rain fall, wind, and radiation.

* * * * *